(12) United States Patent
Taeuber et al.

(10) Patent No.: US 7,783,826 B2
(45) Date of Patent: Aug. 24, 2010

(54) DATA BUS WIDTH CONVERTER

(75) Inventors: Andreas Taeuber, Unterschleissheim (DE); Detlev Richter, Munich (DE); Luca de Ambroggi, Munich (DE); Rainer Spielberg, Kirchheim (DE)

(73) Assignee: Qimonda AG, Munich (DE)

( * ) Notice: Subject to any disclaimer, the term of this patent is extended or adjusted under 35 U.S.C. 154(b) by 282 days.

(21) Appl. No.: 11/529,711

(22) Filed: Sep. 28, 2006

(65) Prior Publication Data

US 2008/0082762 A1 Apr. 3, 2008

(51) Int. Cl.
*G06F 12/00* (2006.01)
*G06F 13/40* (2006.01)

(52) U.S. Cl. ................... 711/105; 711/201; 710/307; 710/308

(58) Field of Classification Search ............ None
See application file for complete search history.

(56) References Cited

U.S. PATENT DOCUMENTS

| 6,098,077 | A | 8/2000 | Sassa |
|---|---|---|---|
| 6,426,893 | B1 | 7/2002 | Conley et al. |
| 6,580,638 | B2 | 6/2003 | Conley et al. |
| 6,842,436 | B2 * | 1/2005 | Moeller ............. 370/321 |
| 7,404,039 | B2 | 7/2008 | Smith |
| 2002/0156539 | A1 | 10/2002 | Ahn |
| 2003/0033573 | A1 | 2/2003 | Tamura et al. |
| 2004/0098551 | A1 * | 5/2004 | Heo et al. ............. 711/167 |
| 2004/0233733 | A1 * | 11/2004 | Peel et al. ............. 365/189.01 |
| 2005/0160218 | A1 | 7/2005 | See et al. |

FOREIGN PATENT DOCUMENTS

| CN | 1804777 A | 7/2006 |
|---|---|---|
| DE | 698 11 992 T2 | 1/2004 |
| DE | 10 2004 040 296 B3 | 3/2006 |
| WO | WO 01/61703 A2 | 8/2001 |

OTHER PUBLICATIONS

Chinese Office Action dated Mar. 18, 2010.

* cited by examiner

*Primary Examiner*—Than Nguyen

(57) ABSTRACT

In one embodiment of the invention, a method of operating a memory system is provided, including concurrently reading data from a plurality of memories of the memory system and outputting the data from the memory system at an output channel capacity of an I/O port of the memory system by converting a data bus width of data read from at least some of the plurality of memories to a data bus width of the I/O port.

17 Claims, 4 Drawing Sheets

DATA BUS WIDTH CONVERTER

TECHNICAL FIELD

The invention relates, in general, to memory systems and to methods of operating memory systems.

BACKGROUND

It is desirable to construct and operate a chip-based memory system having fast read/write speeds and a high storage capacity.

SUMMARY OF THE INVENTION

In one embodiment of the invention, a method of operating a memory system is provided, including concurrently reading data from a plurality of memories of the memory system and outputting the data from the memory system at an output channel capacity of an I/O port of the memory system by converting a data bus width of data read from at least some of the plurality of memories to a data bus width of the I/O port.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

As used herein the terms connected and coupled are intended to include both direct and indirect connection and coupling, respectively.

Figure 1:
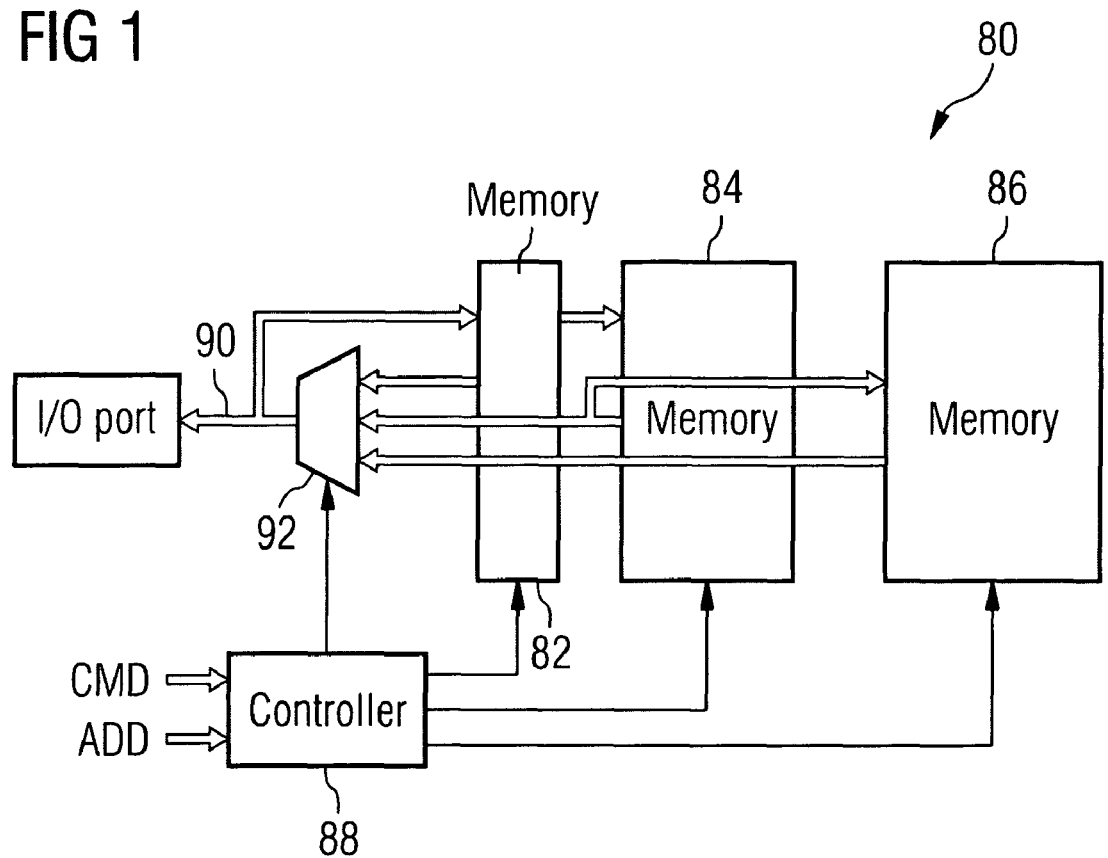
FIG. 1 is a block diagram showing an example of a first embodiment of a memory system.

FIG. 1 is a block diagram showing an example of a first embodiment of a memory system 80 including a plurality of non-volatile memories 82, 84, 86 and a controller 88 controlling data transfer between the plurality of memories 82, 84, 86 and an input/output (I/O) port 90 or bus. The I/O port 90 connects the memory system 80 to external components (not shown). Many different types of storage elements could be selected to form the memories 82, 84, 86. As one example, the memories 82, 84, 86 could be formed from resistive memory elements, for example, programmable metallization cells (PMC) or as another example, phase change memory elements. Not all of the memories 82, 84, 86 need to be constructed using the same type of memory elements that are used in other memories. Some or all of the memories 82, 84, 86 can be multilevel memories. In alternative embodiments of the invention, the memory elements could be formed from charge storage memories such as floating gate memories or charge trapping memories, such as nitrided read only memories (NROM).

The controller 88 controls writing of data into the plurality of memories 82, 84, 86 of the memory system in a serial manner, in other words, in consecutive manner. For example, incoming data is first written from the I/O port 90 to the first memory 82. When the amount of data being stored in the first memory 82 reaches a predetermined threshold, at least some and perhaps all of the data stored in the first memory 82 is copied from the first memory 82 into the second memory 84. This predetermined threshold represents a situation when the first memory 82 is close to being full, is completely full, or some other desired value. When the amount of data being stored in the second memory 84 reaches a predetermined threshold, at least some and perhaps all of the data stored in the second memory 84 is written into the third memory 86. If additional memories are implemented, this sequential procedure can be continued until the last memory is reached.

Some or all of the memories 82, 84, 86 can have different storage capacities. Each memory 82, 84, 86 that is further down the line in the writing sequence can have, for example, a storage capacity that is greater than that of the previous memory. For example, the second memory 84 can be constructed with a larger storage capacity than the first memory 82, the third memory 86 can be constructed with a larger storage capacity than the second memory 84, and if additional memories are present, the storage capacity can be continually increased for each additional level. The storage capacity can be increased, for example, by increasing the storage density of the storage elements and/or the number of storage levels of the storage elements. In this example, the second memory 84 is a 2-level non-volatile memory (NVM) and the third memory 86 is a 4-level non-volatile memory (NVM). The third memory 86 could be constructed with an even higher number of levels if desired. Any of the memories 82, 84, 86 can be formed using any one of many known architectures and may be formed, for example, from multiple arrays. Any of the memories 82, 84, 86 may even include multiple memories. The memories 82, 84, 86 may be arranged on the same or on different chips.

Some or all of the memories 82, 84, 86 can have different data bandwidths. The term "different data bandwidths" is intended to mean that the memories 82, 84, 86 have different write speeds when being written to and analogously have different read speeds when being read from and, therefore, provide different input/output timing behavior at the input/output interface of the respective memory 82, 84, 86. For example, if the second memory 84 is constructed as a 2-level non-volatile memory and the third memory 86 is constructed as a 4-level non-volatile memory, it will take longer to write to the third memory 86 than to the second memory 84 because of the greater complexity of the third memory 86. Analogously, it will take longer to read from the third memory 86.

There is a direct data output path from each of the memories 82, 84, 86 to the multiplexer 92. When the command signals applied to the command lines CMD indicate that a read is to be performed, the controller 88 reads data from a particular one of the plurality of memories 82, 84, 86 of the memory system selected by the multiplexer 92 depending on the address signals applied to the address lines ADD going to the controller 88. The controller 88 thus appropriately controls the multiplexer 92 to place the data read from the appropriate one of the memories 82, 84, 86 to the I/O port 90. Since the read speed of some or all of the memories 82, 84, 86 is different, the time required to output the desired data will depend upon which one of the memories 82, 84, 86 is read. For example, suppose that the first memory 82 has the fastest read speed, the second memory 84 has a slower read speed, and the third memory 86 has an even slower read speed. In this case, for example, it will take longer to obtain data stored in the third memory 86 than it takes to obtain data stored in the second memory 84. This time difference is compensated for in accordance with one embodiment of the invention.

The term, "unit of data," can be defined, for example, as a collection of data of a predefined size, for example, a block of a certain size. The controller 88 manages the data so that a group of the most recently accessed units of data are stored in the first memory 82, which has the fastest read speed, a group of the next most recently used units of data are stored in the second memory 84, which has the next fastest read speed, and a group of units of data accessed the longest time ago are stored in the third memory 86, which has the slowest read speed. Whenever the time period since a respective unit of data has been last accessed exceeds a predetermined time period or number of access cycles, the respective unit of data will be copied into the memory that is next in the serial input chain that is formed by the memories 82, 84, 86. This next memory will likely have a read speed that is slower than the read speed of the memory in which the unit of data is presently stored. For example, whenever the time period since a respective unit of data in the second memory 84 has been last accessed exceeds a predetermined time period or number of access cycles, the respective unit of data will be copied into the third memory 86. By using this procedure, the controller 88 insures that more recently accessed data will be available in a shorter time period than data that has not been accessed as recently. In general, those data, which need to be accessed fastest are stored in the first memory 82.

Figure 2:
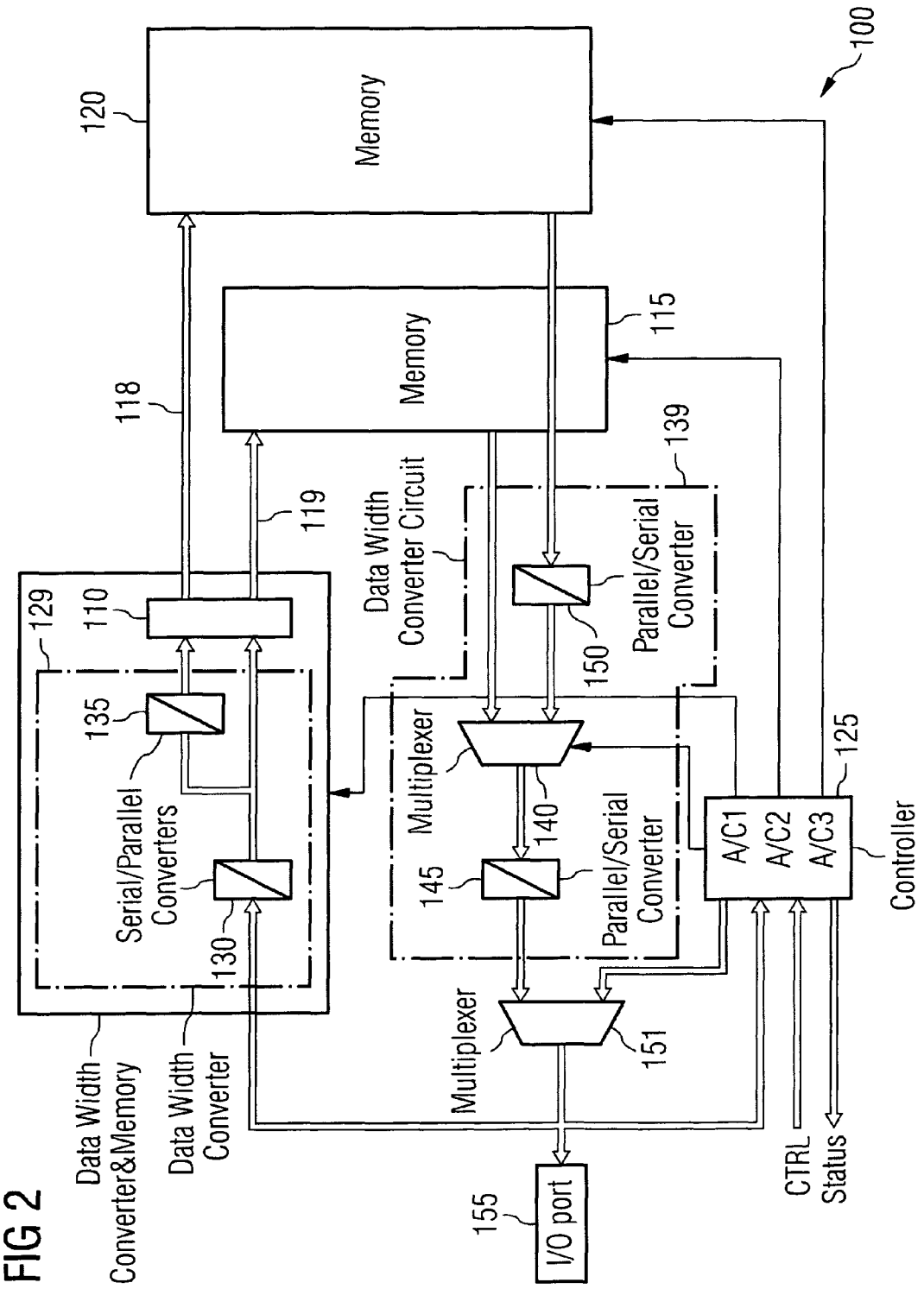
FIG. 2 is a block diagram showing an example of a second embodiment of a memory system.

FIG. 2 is a block diagram showing an example of a second embodiment of a memory system 100 including a plurality of memories 110, 115, and 120 and control means, for example, a controller 125. The controller 125 has address and control lines A/C1, A/C2, and A/C3 controlling the plurality of memories 110, 115, and 120. In this example, only a first memory 110, a second memory 115, and a third memory 120 are shown, however additional memories could be implemented. There are different possibilities for utilizing the first memory 110. In this example, the first memory 110 acts as a write buffer. In this case, the first memory 110 is a fast cache memory, which could be a volatile memory such as, for example, an SRAM (synchronous random access memory). In one embodiment of the invention, the first memory 110 may be a sufficiently fast non-volatile memory. All of the other memories 115 and 120 (and additional memories if provided) are constructed as non-volatile memories and can be formed from resistive memory elements, for example, programmable metallization cells (PMC) or phase change memory elements. In alternative embodiments of the invention, the memories 115 and 120 could be formed from charge storage memories such as floating gate memories or charge trapping memories, such as nitrided read only memories (NROM). Some or all of the other memories 110, 115 and 120 can be multilevel memories. The memories 115 and 120 can use any of a number of memory designs and architectures, and may be formed, for example, from multiple arrays. Each of the memories 115 and 120 could also include multiple memories. The memories 110, 115, 120 may be arranged on the same or on different chips.

This embodiment is based on writing data to different memories 115, 120 of the memory system 100 by increasing the data bus width and thereby reducing the data transfer rate or data rate of the incoming data to account for the different write speeds of the memories 115, 120. Analogously, when the memories 115, 120 are read, the data bus width is decreased thereby increasing the data rate of the read data to account for the different read speeds of the memories 115, 120. In this manner, the data bandwidth remains constant throughout the entire memory system 100 at the I/O port 155 and the write speed differences and read speed differences of the memories 115, 120 cannot be detected externally from the memory system 100. In other words, the external I/O port 155 timing behavior remains constant and the internal differences of the read speeds and write speeds are compensated for within the memory system 100 so that they become transparent from the outside at the I/O port 155.

For example, when reading from the memory system, the data bandwidth of each one of the memories 115, 120 can be adapted to the data bandwidth of the I/O means or I/O port 155. Since a particular memory, say the third memory 120, for example, is not being read at the speed that is used at the I/O port 155, the data bus width at the third memory 120 is set to be greater than the data bus width at the I/O port 155 by an appropriate factor such that the data bandwidth at the third memory 120 equals the data bandwidth of the I/O port 155.

A unit of data, for example, a block, being stored in the memory system 100 can be divided into two portions in which a first portion is stored in the second memory 115 and a second portion is stored in the third memory 120. The memory system 100 can be constructed such that the third memory 120, having a slower read speed and slower write speed, does not delay the outputting of any portions of the unit of data. Data from the slower third memory 120 can be read and collected while data from the faster second memory 115 is being read and output. After the first portion of the unit of data is output from the faster second memory 115, the second portion of the data from the slower third memory 120 is immediately available for output.

The access speeds (read speeds and/or write speeds) or equivalent access times of the memories 110, 115, and 120 might be different because the storage densities are different and the number of levels being managed is different. The second memory 115 is non-volatile and has a medium access time and medium storage capacity, and the third memory 120 is non-volatile and has a higher storage capacity and a longer access time.

The second embodiment of the memory system 100 is designed to compensate for the different write times or speeds of the memories 115 and 120 by advantageously using data bus width converter means, for example, a first data bus width converter circuit 129 including a first serial to parallel converter 130 (in one embodiment of the invention, a first parallel to parallel converter) and a second serial to parallel converter 135 (in one embodiment of the invention, a second parallel to parallel converter). The first data bus width converter circuit 129 splits the incoming unit of data, which could be a block, into a plurality of portions, in this example, two portions. The serial to parallel converters 130, 135 are constructed from a chain of shift registers with a single input and a plurality of parallel outputs providing data after the input data has been shifted in. Each serial to parallel converter 130 and 135 reduces the data rate of the incoming data by increasing the data bus width and thereby increasing the parallelism. The data rate reduction required by the first serial to parallel converter 130 depends on the write speed of the second memory 115. The data rate reduction required by the second serial to parallel converter 135 depends on the write speed of the third memory 120 and on the reduction in the incoming data rate that has already been provided by the first serial to parallel converter 130. If additional memories are implemented, then the first data bus width converter circuit 129 can include additional serial to parallel converters for each additional memory assuming that the write time of the additional memory is longer than that of the previous memory. The page width required to efficiently use each memory is determined using a ratio between the write speed of the respective memory and the data rate of the input data.

For example, if the data bus width coming into the I/O port 155 is 1 byte, the first serial to parallel converter 130 could increase the data bus width to a size of 8 bytes, thereby reducing the data rate of the data being input to the second memory 115 by a factor of 8. Likewise, the second serial to parallel converter 135 could increase the data bus width by another factor of 4 to obtain a data bus width of 32 bytes and to reduce the data rate of the data being input to the third memory 120 by another factor of 4. In this manner the input data rate of the incoming data can be adjusted to account for the different write times or write speeds of the different memories 115, 120. The write speeds are different because the storage densities of the memories 115, 120 are different and the number of levels being managed is different. The factors have merely been provided to explain the process and the exact factors will depend on the write times or write speeds of the respective memories.

When writing to the memory system 100, both memories 115 and 120 can be written to. The earliest data coming in from the I/O port 155 goes into the faster part of the memory system 100 and the later data coming in from the I/O port 155 is collected and put in the slower part of the memory system 100, as will be described in more detail below. For example, if a unit of data, a data block in this example, of a size of 512 bytes is coming into the memory system 100, the data bus width converter circuit 129 could split the data block into a 12 byte portion and a 500 byte portion. The first 12 bytes could be written into the second memory 115 and the remaining 500 bytes could be written into the third memory 120. These numbers are provided merely to explain the principle. The first memory 110 acts as a buffer so that after, e.g., the 12 bytes have been collected in the first memory 110, a write operation is triggered to write the first collected data to the second memory 115 using the data bus 119. Then, after, e.g., the remaining 500 bytes have been collected in the first memory 110, a write operation is triggered to write the second collected data to the third memory 120 using the data bus 118.

The controller 125 receives control signals from a control signal path CTRL and can provide status data on a status signal path STATUS. The controller 125 has status registers that receive data from the I/O port 155. The controller 125 can also output status data to the I/O port 155.

The memory system 100 includes a first multiplexer 140 so that the controller 125 can select either the data being read from the second memory 115 or the data being read from the third memory 120 for output on the I/O port 155. The memory system 100 includes a second multiplexer 151 so that the controller 125 can select either the data being output from the first multiplexer 140 or status data from the controller 125 for output on the I/O port 155. This feature enables the memory system 100 to be compliant with an interface standard for HDD (hard disk drives), for example, the ATA (advanced technology attachment) standard or the SCSI (Small Computer System Interface) standard. By being compliant with a suitable interface standard, the memory system 100 could be used as a substitute for a hard disk drive if desired. In an alternative embodiment of the invention, the memory system 100 is compliant with any other desired interface standard, for example with any other desired HDD interface standard.

Reading the memory system 100 will now be described. The memory system 100 includes a second data bus width converter means, for example, a second data bus width converter circuit 139 that acts to decrease the data bus width and to increase the data rate of the data being read from the memories 115 and 120.

The second data bus width converter circuit 139 includes a first parallel to serial converter 145 (in an alternative embodiment of the invention, a first parallel to parallel converter) to decrease the data bus width and increase the data rate of the data being read from the second memory 115. The first parallel to serial converter 145 performs the inverse operation of that performed by the first serial to parallel converter 130. Considering the example given when discussing the first serial to parallel converter 130, it is seen that the first parallel to serial converter 145 would decrease the data bus width from a size of 8 bytes to a size of 1 byte, thereby increasing the data rate of the data being output from the second memory 115 by a factor of 8 and matching the data rate to that of the I/O port 155.

The second data bus width converter circuit 139 includes a second parallel to serial converter 150 (in an alternative embodiment of the invention, a second parallel to parallel converter) to decrease the data bus width and increase the data rate of the data being read from the third memory 120. The second parallel to serial converter 150 performs the inverse operation of that performed by the second serial to parallel converter 135. Considering the example given when discussing the second serial to parallel converter 135, it is seen that the second parallel to serial converter 150 would decrease the data bus width from a size of 32 bytes to a size of 8 bytes, thereby increasing the data rate of the data being output from the third memory 120 by a factor of 4. The data being output from the third memory 120 is also converted by the first parallel to serial converter 145 so that the data bus width is decreased further from a size of 8 bytes to a size of 1 byte, thereby further increasing the data rate of the data being output from the third memory 120 by a factor of 8 and matching the data rate to that of the I/O port 155.

Let us again consider the example given above where a data block of a size of 512 bytes has been stored in the memory system 100. The first 12 bytes have been stored in the second memory 115 and the remaining 500 bytes have been stored in the third memory 120. To read from the memory system 100, the controller 125 concurrently accesses the second memory 115 and the third memory 120. The first 12 bytes are read from the second memory 115, are converted by the first parallel to serial converter 145, and are output on the I/O port 155. At the same time, the remaining 500 bytes are read from the third memory 120 and are converted by the second parallel to serial converter 150. After the first 12 bytes have been output, the remaining 500 bytes are transferred from the first parallel to serial converter 145 to the I/O port 155 for output. In this way, some or preferably all of the time required to read the slower third memory 120 occurs concurrently with the outputting of the data from the second memory 115 so that either a much smaller delay or preferably no delay occurs at all between outputting the data read from the second memory 115 and outputting the data read from the third memory 120.

Figure 3:
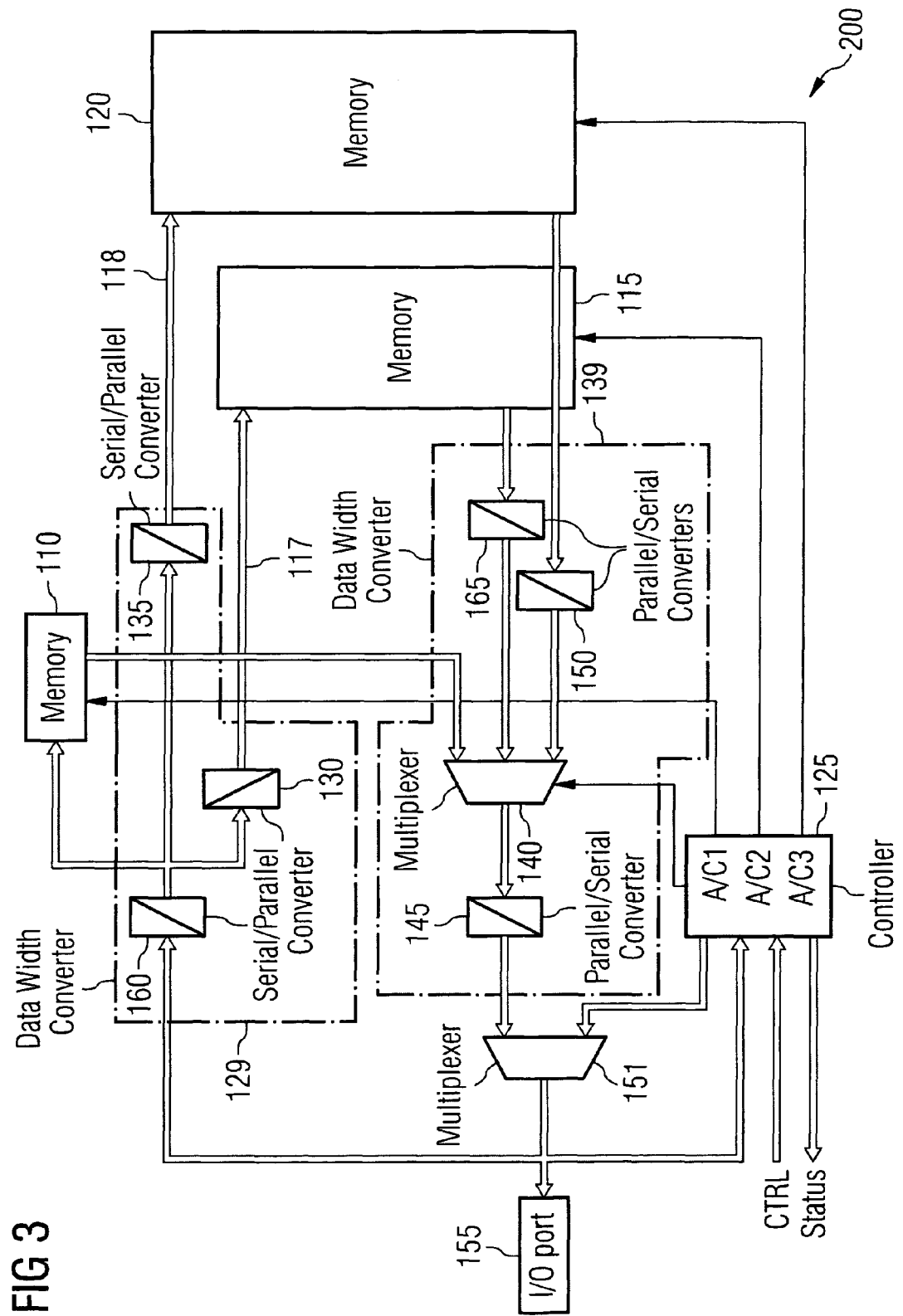
FIG. 3 is a block diagram showing an example of a third embodiment of a memory system.

FIG. 3 is a block diagram showing an example of a third embodiment of a memory system 200. Portions of the memory system 200 functioning similar to those shown in FIG. 2 are identified using the same reference numerals and will not be described again. In this embodiment, the unit of data, for example, a data block being stored is divided into three portions instead of just two portions as was the case in the second embodiment. In this embodiment, the first memory 110 is not constructed to act as a write buffer, but rather the first memory 110 is constructed as a non-volatile memory and is used to store a first portion of a data block. A second portion of the data block is stored in the second memory 115 and a third portion of the data block is stored in the third memory 120. Notice that the data bus 119 is now also connected to the first multiplexer 140 so that the first multiplexer 140 can apply the first portion of the data block that is read from the first memory 110 via the data bus 119 to the first parallel to serial converter 145.

If necessary, the first data bus width converter 129 can include a third serial to parallel converter 160 to receive incoming data from the I/O port 155 and to increase the data bus width and reduce the data rate of the incoming data from the I/O port 155. In this example, the third serial to parallel converter 160 will be the only serial to parallel converter acting on the first portion of the data block being stored in the first memory 110. The first serial to parallel converter 130 and the second serial to parallel converter 135 are constructed to cooperate with the third serial to parallel converter 160 so that each memory 115, 120 obtains data (a respective portion of the data block) having the proper data bus width and data rate for storage therein via data buses 117, 118, respectively.

Likewise, the third data bus width converter 139 can include a third parallel to serial converter 165 (in an alternative embodiment of the invention, a third parallel to parallel converter) to appropriately change the data bus width and data rate of the second portion of the data block being read from the second memory 115. The first parallel to serial converter 145 is constructed to operate on the data (a respective portion of the data block) read from all of the memories 110, 115, and 120 so that all portions of the data block output on the I/O port 155 have the proper data bus width and data rate. As an alternative configuration, the output from the second parallel to serial converter 150 could be multiplexed into the input of the third parallel to serial converter 165 so that the third portion of the data block being read from the third memory 120 would pass through all three parallel to serial converters 165, 150, and 145, although this option is not shown in the drawings.

Figure 4A:
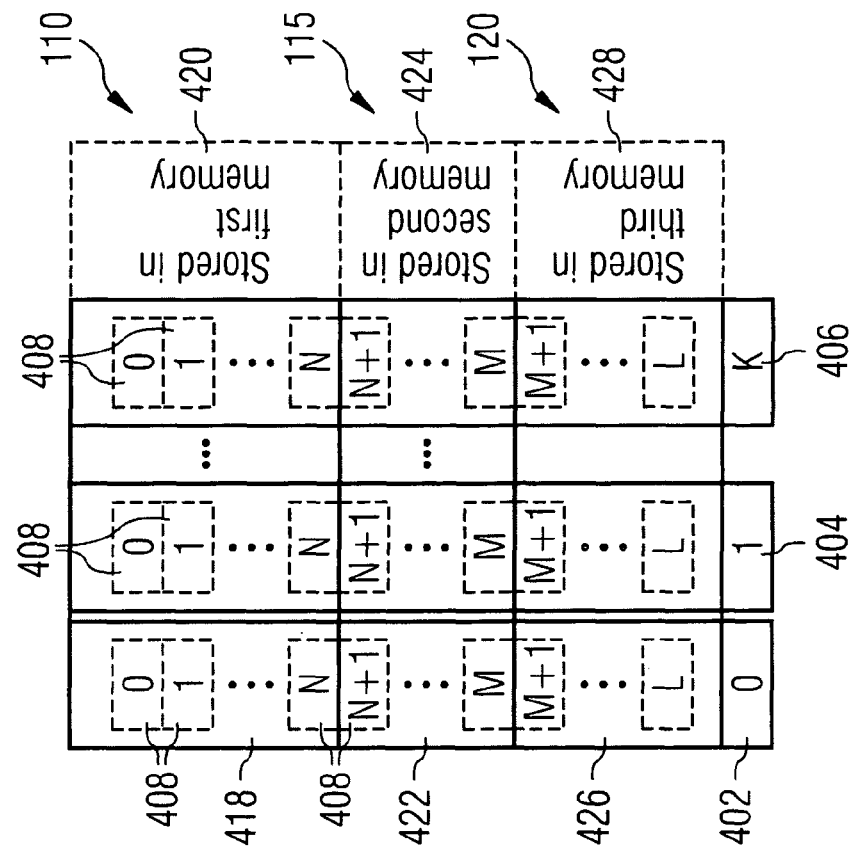
FIG. 4A is a diagram of the first memory of the memory system of FIG. 2 illustrating the data partitioning in accordance with one embodiment of the invention.

FIG. 4A is a diagram of the memories 110, 115, 120 of the memory system 100 of FIG. 2 illustrating the data partitioning in accordance with one embodiment of the invention. In this embodiment of the invention, the first memory 110 serves as a write buffer. FIG. 4A shows a plurality of K (K being an arbitrary number greater than 0) data blocks (a first data block 402, a second data block 404, . . . , a K-th data block 406), which can be individually addressed. Each data block 402, 404, 406 includes M (M being an arbitrary number greater than 1) data elements, e.g., data bytes 408 (each data byte including eighth data bits). As is shown in FIG. 4A, the data bytes of each block are successively written into the first memory 110 via the first serial to parallel converter 130 and the second serial to parallel converter 135. In other words, the first N+1 data bytes (data bytes 0 to N) of each block 402, 404, 406 are written into a first region 410 of the first memory 110 from the first serial to parallel converter 130 and are then transferred to the second memory 115 (symbolized in FIG. 4A by a block 412). Furthermore, the data bytes (N+1) to M are first written from the first serial to parallel converter 130 into the second serial to parallel converter 135 and then from the second serial to parallel converter 135 into a second region 414 of the first memory 110. Then, the data bytes (N+1) to M are transferred to the third memory 120 (symbolized in FIG. 4A by a block 416).

Figure 4B:
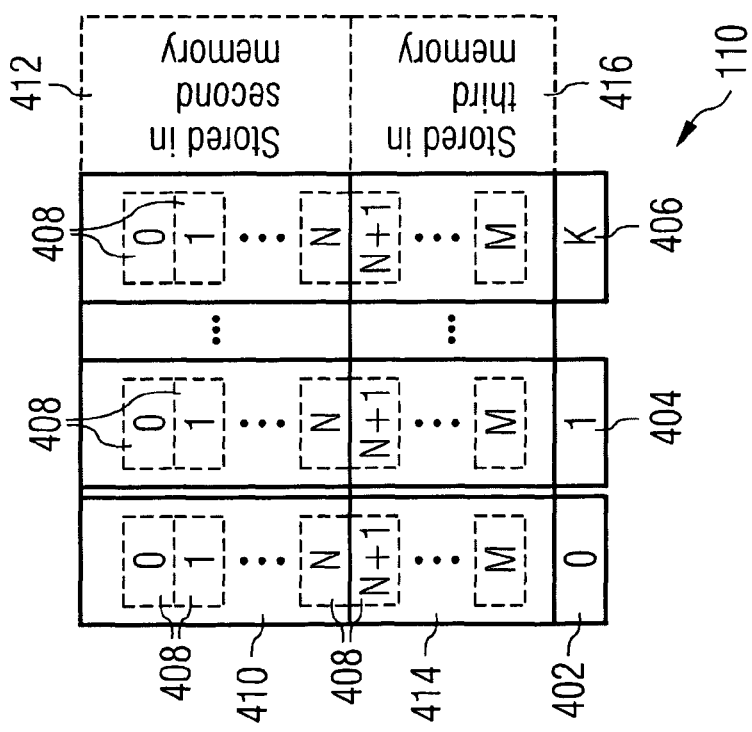
FIG. 4B is a diagram of the memories of the memory system of FIG. 3 illustrating the data partitioning in accordance with one embodiment of the invention.

FIG. 4B is a diagram of the first memory 110 of the memory system 200 of FIG. 3 illustrating the data partitioning in accordance with another embodiment of the invention. In this embodiment of the invention, the first memory 110 serves as a non-volatile memory as well. FIG. 4B shows a plurality of K (K being an arbitrary number greater than 0) data blocks (a first data block 402, a second data block 404, . . . , a K-th data block 406), which can be individually addressed. Each data block 402, 404, 406 includes L (L being an arbitrary number greater than 2) data elements, e.g., data bytes 408 (each data byte including eighth data bits). As is shown in FIG. 4B, the data bytes of each block are successively written into the first memory 110 via the third serial to parallel converter 160, into the second memory 115 via the third serial to parallel converter 160 and the first serial to parallel converter 130, and into the third memory 120 via the first serial to parallel converter 130, the second serial to parallel converter 135 and the third serial to parallel converter 160. In other words, the first N+1 data bytes (data bytes 0 to N) of each block 402, 404, 406 are written into a memory region 418 of the first memory 110 from the third serial to parallel converter 160 and are then kept in the first memory 110 in a non-volatile manner (symbolized in FIG. 4B by a block 420). Furthermore, the data bytes (N+1) to M are first written from the third serial to parallel converter 160 into the first serial to parallel converter 130 and then from the first serial to parallel converter 130 into a memory region 422 of the second memory 120 (symbolized in FIG. 4B by a block 424). Further, the data bytes (M+1) to L are first written from the third serial to parallel converter 160 into the second serial to parallel converter 135 and then from the second serial to parallel converter 135 into a memory region 426 of the third memory 120 (symbolized in FIG. 4B by a block 428).

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A memory system comprising:
an I/O port having an I/O port data bus width;
a plurality of memories, each one of the plurality of memories having a memory data bus width, wherein at least a part of the plurality of memories are serially connected to each other;
a data bus width converter circuit converting a data size from the memory data bus width of at least one of the plurality of memories being read to the I/O port data bus width of the I/O port; and
a controller controlling data transfer between the plurality of memories and the I/O port, wherein the controller is configured such that it controls copying of at least some of the data stored in a first memory of the plurality of memories into a second serially connected memory of the plurality of memories.

2. The memory system according to claim 1 wherein the memory data bus width of each one of the plurality of memories is dependent on the speed of the one of the plurality of memories.

3. The memory system according to claim 1 wherein the I/O port has an I/O port data bandwidth, and wherein each one of the plurality of memories has a memory data bandwidth at least equal to the I/O port data bandwidth of the I/O port when being read.

4. The memory system according to claim 1 wherein the data bus width converter circuit includes a plurality of parallel to serial converters or a plurality of parallel to parallel converters.

5. The memory system according to claim 4 wherein the data bus width converter circuit includes at least one multiplexer selectively connecting at least some of the plurality of memories to the I/O port to put data read from a selected one of the plurality of memories onto the I/O port.

6. The memory system according to claim 1, further comprising a multiplexer selectively connecting the controller to the I/O port to put information from the controller onto the I/O port, wherein the controller is connected to the I/O port to receive information from the I/O port.

7. The memory system according to claim 1, further comprising a multiplexer selectively connecting at least some of the plurality of memories to the I/O port to put data read from at least some of the plurality of memories onto the I/O port, wherein the controller is connected to the I/O port to receive information from the I/O port.

8. The memory system according to claim 1, further comprising a data bus width converter circuit connected to the I/O port to split an incoming unit of data from the I/O port into a plurality of portions, wherein each one of the plurality of portions of the unit of data is sized to correspond to the memory data bus width of a respective one of the plurality of memories.

9. The memory system according to claim 8 wherein the data bus width converter circuit includes a plurality of serial to parallel converters or a plurality of parallel to parallel converters.

10. The memory system according to claim 8, further comprising an additional memory serving as a write buffer by buffering each one of the plurality of portions of the unit of data before being written into the respective one of the plurality of memories.

11. The memory system according to claim 1 wherein at least some of the plurality of memories having a read speed different than that of others of the plurality of memories.

12. The memory system according to claim 1 wherein the controller concurrently initiates a read access of more than one of the plurality of memories.

13. A memory system comprising:
an I/O port formed with an I/O port data bus width;
a plurality of memories, each one of the plurality of memories formed with a memory data bus width, wherein at least a part of the plurality of memories are serially connected to each other;
a data bus width converter circuit converting the memory data bus width of at least one of the plurality of memories being programmed to the I/O port data bus width of the I/O port; and
a controller controlling data transfer between the plurality of memories and the I/O port, wherein the controller is configured such that it controls copying of at least some of the data stored in a first memory of the plurality of memories into a second serially connected memory of the plurality of memories.

14. The memory system according to claim 13 wherein the memory data bus width of each one of the plurality of memories is dependent on the speed of the one of the plurality of memories.

15. A memory system comprising:
I/O means formed with an I/O data bus width;
a plurality of memories, each one of the plurality of memories formed with a memory data bus width, wherein at least a part of the plurality of memories are serially connected to each other;
data bus width converter means reducing a data size from the memory data bus width of at least one of the plurality of memories being read to the I/O data bus width of the I/O means; and
controller means controlling data transfer between the plurality of memories and the I/O means, wherein the controller means is configured such that it controls copying of at least some of the data stored in a first memory of the plurality of memories into a second serially connected memory of the plurality of memories.

16. The memory system according to claim 15, wherein the data bus width converter means is connected to the I/O means to split an incoming unit of data from the I/O means into a plurality of portions, and wherein each one of the plurality of portions of the unit of data is sized to equal the memory data bus width of a respective one of the plurality of memories.

17. A memory system comprising:
I/O means formed with an I/O data bus width;
a plurality of memories, each one of the plurality of memories formed with a memory data bus width, wherein at least a part of the plurality of memories are serially connected to each other;
data bus width converter means reducing a data size from the memory data bus width of at least one of the plurality of memories being read to the I/O data bus width of the I/O means;
controller means controlling data transfer between the plurality of memories and the I/O means, wherein the controller means is configured such that it controls copying of at least some of the data stored in a first memory of the plurality of memories into a second serially connected memory of the plurality of memories; and
data bus width converter means connected to the I/O means to split an incoming unit of data from the I/O means into a plurality of portions, wherein each one of the plurality of portions of the unit of data is sized to equal the memory data bus width of a respective one of the plurality of memories.

* * * * *